United States Patent [19]

Pipinias

[11] Patent Number: 5,383,648
[45] Date of Patent: Jan. 24, 1995

[54] VALVE FOR CONTROLLING FLOW

[75] Inventor: John Pipinias, Eliot, Me.

[73] Assignee: Milton Roy Company, Arvada, Colo.

[21] Appl. No.: 184,263

[22] Filed: Jan. 21, 1994

[51] Int. Cl.⁶ .............................. F16K 1/52; F16K 1/02
[52] U.S. Cl. ..................... 251/333; 251/205; 251/900
[58] Field of Search ..................... 251/333, 900, 205

[56] References Cited

U.S. PATENT DOCUMENTS

| | | | |
|---|---|---|---|
| 2,616,653 | 11/1952 | Tarr | 251/900 X |
| 3,294,360 | 12/1966 | Lundberg | 251/205 |
| 3,403,698 | 10/1968 | Klun | 251/205 X |
| 3,455,536 | 7/1969 | Barker | 251/333 |
| 5,267,585 | 12/1993 | Jones | 251/205 X |

Primary Examiner—Arnold Rosenthal

[57] ABSTRACT

A pressure surface forming a boundary of a plenum has an orifice therein through which the flow is channeled. An elastomeric body having a surface with curvature different than that of the pressure surface is squeezed to varying degrees against the pressure surface causing the elastomeric body to contact the pressure surface over an area which increases with increasing squeeze. The orifice is positioned and sized to be wholly within the maximum contact area of the elastomeric body with the pressure surface and to extend outside of the minimum area. At intermediate degrees of squeezing the elastomeric body exposes a finely controlled opening for flow through the orifice.

2 Claims, 1 Drawing Sheet

VALVE FOR CONTROLLING FLOW

BRIEF SUMMARY OF THE INVENTION

This invention relates to controlling flow with valves and particularly to providing a fine control over such flow.

The invention features a pressure surface forming a boundary of a plenum and having an orifice therein through which the flow is channeled. A body made of elastomeric material and having a surface with curvature different than that of the pressure surface is captured within the plenum so as to be in contact with the pressure surface. A second structural component is controllably moved toward the first to squeeze the elastomeric body against the pressure surface to different degrees. As the squeezing is increased, the contact area between the elastomeric body and the pressure surface increases from a minimum value to a maximum value. The orifice is positioned and sized to be wholly within the maximum contact area of the elastomeric body with the pressure surface and to extend outside of the minimum area. At intermediate degrees of squeezing the elastomeric body exposes a finely controlled opening for flow through the orifice.

DETAILED DESCRIPTION

Figure 1:
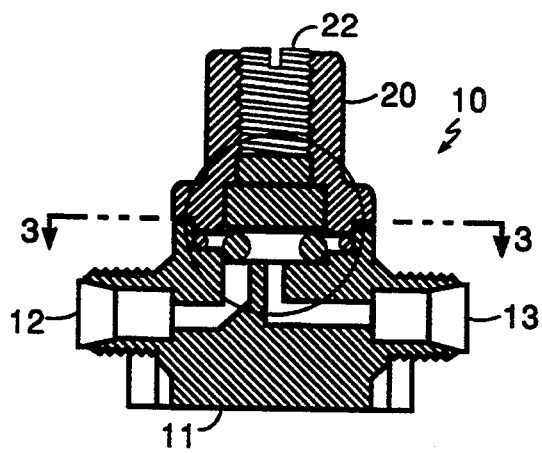
FIG. 1 shows in cross-section a valve according to the invention.
Figure 2:
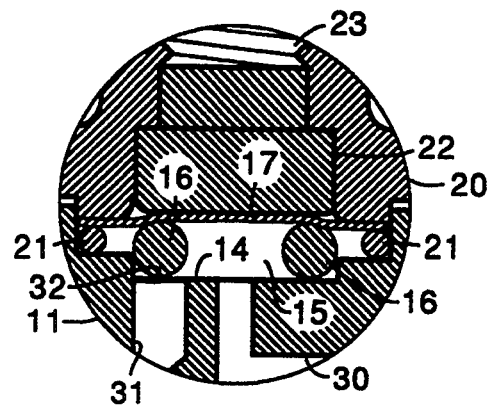
FIG. 2 shows at larger scale a detail of the valve of FIG. 1.
Figure 3:
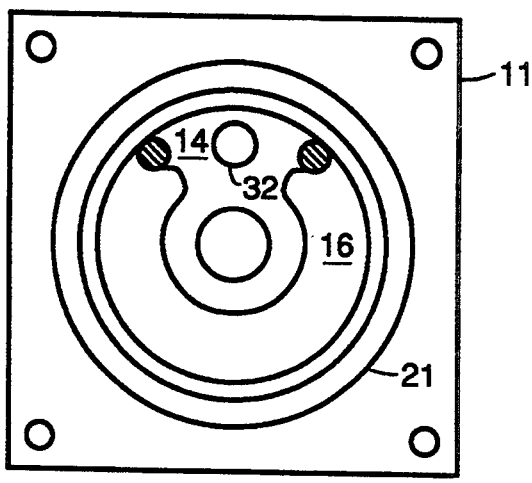
FIG. 3 shows a view of the valve of FIG. 1 with its top portion removed on the plane 3—3.

Referring to the Figures, particularly FIGS. 1, 2, and 3, valve 10, according to the invention, includes structural component 11 having therein first port 12 for discharge of fluid and port 13 for entrance of fluid. Structural component 11 also includes pressure surface 14. An elastomeric body made of elastomeric material and with a bounding surface having a curvature different than that of pressure surface 14 is provided by o-ring 16. Pressure surface 14 together with o-ring 16 and sealing membrane 17 form boundaries of plenum 15.

Cap 20 is affixed to structural component 11 and presses membrane 17 against o-ring 21 to seal the join of cap 20 to component 11. Second structural component 22 is threaded into cap 20 with screw threads 23 so that it can be advanced toward structural component 11 to squeeze o-ring 16 against pressure surface 14.

Flow channel 30 passes through structural component 11, providing communication between port 13 and plenum 14. Flow channel 31 passes through structural component 11 providing communication between port 12 and orifice 32 at pressure surface 14.

Figure 4:
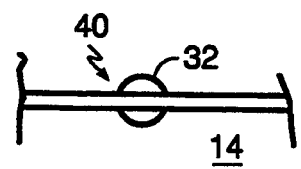
FIG. 4 shows a portion of the pressure surface of the valve of FIG. 1, particularly showing the contact area with the elastomeric body when the body is minimally squeezed.
Figure 5:
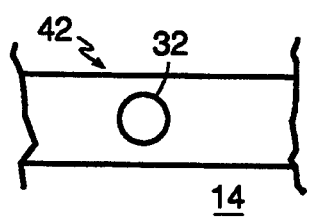
FIG. 5 shows the same portion of the pressure surface of the valve of FIG. 1 as shown in FIG. 4, when the elastomeric body is maximally squeezed.

The operation of the valve is as follows. Suppose structural component 22 to be screwed back away from pressure surface 14 to one end of its range of movement. In this position, structural component 22 through membrane 17 presses o-ring 16 against pressure surface 14 only lightly, and the o-ring is minimally deformed. Since the curvature of the o-ring is not the same as that of the pressure surface, the o-ring and the pressure surface will contact each other over only a very small area 40, as shown in FIG. 4. Suppose now that the second structural component is advanced toward pressure surface 14 to the other end of its range of movement. In this position the second structural component 22 squeezes the o-ring against the pressure surface forcing the elastomeric o-ring into a maximally deformed condition in which a portion of its surface conforms to the pressure surface. In this condition as shown in FIG. 5, the area 42 of contact between the o-ring and the pressure surface is considerably enlarged.

The position and size of orifice 32 at pressure surface 14 is such that it is wholly within area 42 while extending outside of area 40. Thus at one end of the range of motion of structural component 22 orifice 32 opens into plenum 15, while at the other end of the range of motion communication between channel 31 and the plenum through the orifice is sealed by the extended contact of the o-ring with pressure surface 14. At intermediate positions of structural component 22 the opening through the orifice is constricted to various degrees which can be controlled very precisely by motion of structural component 22 to provide corresponding precise control of flow of fluid through the valve.

A valve as described above has particular advantages for service with corrosive fluids since none of the operating parts require high strength or very precise dimensions and so can be readily be made of organic polymeric materials which resist corrosion.

What is claimed is:

1. A valve for controlling flow of a fluid comprising
    a first structural component having a pressure surface, said pressure surface forming a boundary of a plenum,
    an elastomeric body made of elastomeric material, said elastomeric body being captured within said plenum so as to be in contact with said pressure surface,
    a second structural component connected to said first structural component through a mechanism for moving said first and second structural components toward each other, so that said elastomeric body is squeezed against said pressure surface,
    a first port and a first flow channel communicating between said first port and said plenum,
    a second port and a second flow channel, said second flow channel communicating between said second port and an orifice at said pressure surface,
    movement of said second structural component relative to said first structural component being through a range which squeezes said elastomeric body from a minimally deformed condition to a maximally deformed condition, the elastomeric body contacting said pressure surface over a first area when in its minimally deformed condition and contacting said pressure surface over a second area larger than said first area when in its maximally deformed condition,
    and wherein said orifice is positioned and sized to be wholly within said second area and extends outside of said first area, and
    wherein said elastomeric body has the form of an o-ring.

2. A valve as claimed in claim 1, wherein all parts contacting the fluid are made of corrosion resisting materials.

* * * * *